Nov. 27, 1928.  
J. HOPKINS  
1,693,444  
AUTOMOBILE FRICTION BRAKE  
Filed Oct. 13, 1927  
2 Sheets-Sheet 1
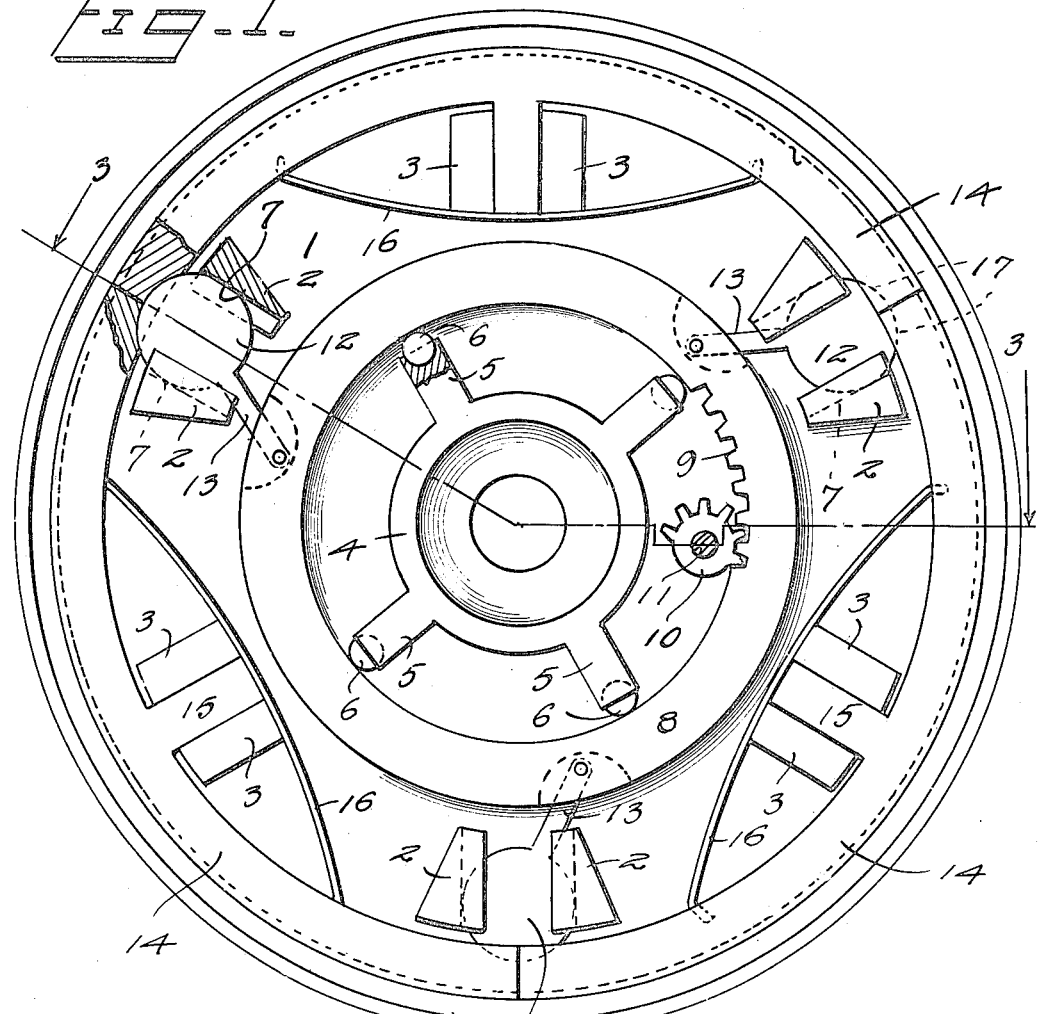
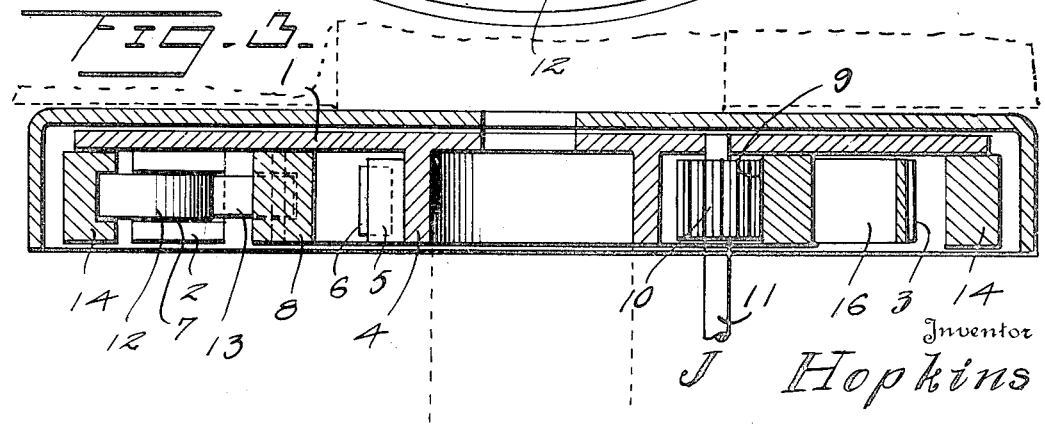
Inventor  
J Hopkins  
By Watson E. Coleman  
Attorney Nov. 27, 1928.  
J. HOPKINS  
1,693,444  
AUTOMOBILE FRICTION BRAKE  
Filed Oct. 13, 1927  
2 Sheets-Sheet 2
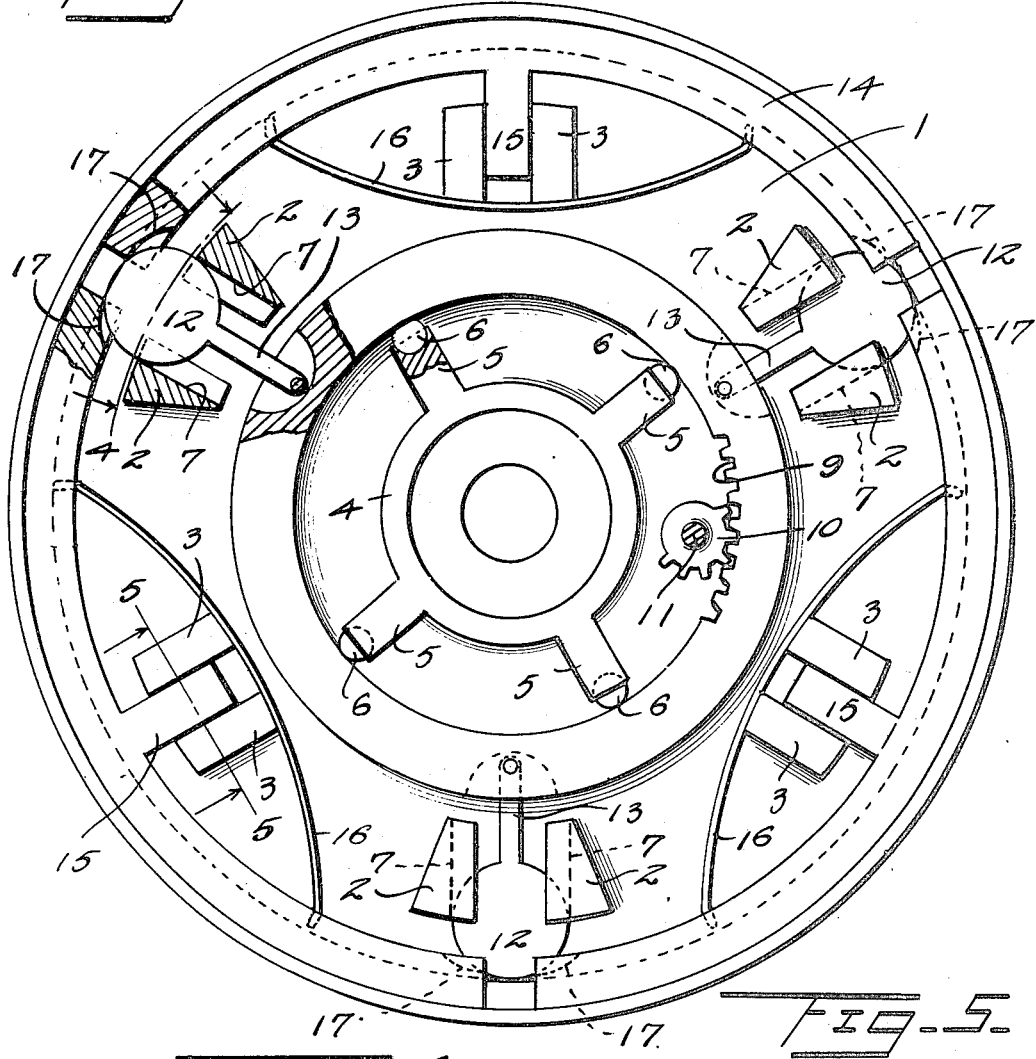
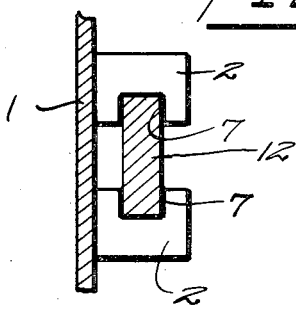
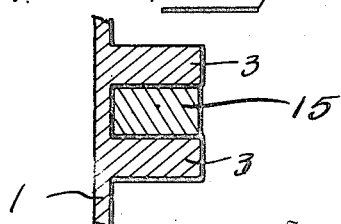
Inventor  
J. Hopkins  
By Watson E. Coleman  
Attorney Patented Nov. 27, 1928.

1,693,444

UNITED STATES PATENT OFFICE.

JESSE HOPKINS, OF DENVER, COLORADO.

AUTOMOBILE FRICTION BRAKE.

Application filed October 13, 1927. Serial No. 226,012.

This invention relates to an automobile friction brake structure and it consists in the novel features hereinafter described and claimed. An object of the invention is to provide a brake structure of the character indicated which is of simple and durable form, positive in its action and having means for promptly returning brake shoes to their normal positions when the brake is released.

A further object of the invention is to provide means for positively and effectually forcing the shoes to applied position and for holding them at such position.

Figure 1 is a side elevational view of the friction brake showing the shoes at normal position;

Figure 2 is a similar view showing the shoes spread;

Figure 3 is a transverse sectional view of the brake cut on the line 3—3 of Figure 1;

Figure 4 is a fragmentary sectional view of the brake cut on the line 4—4 of Figure 2;

Figure 5 is a similar view cut on the line 5—5 of Figure 2.

The brake structure comprises a main frame 1, preferably a malleable casting, said frame having spaced lugs 2 formed thereon and spaced lugs 3 also formed thereon. A spider 4 is formed at the center of the frame 1 and is provided with radially disposed arms 5 having at their outer ends antifriction members 6. The lugs 2 are provided at their inner sides with grooves 7. A ring 8 is mounted at the side of the frame 1 and receives the spider 4 and the parts carried thereby. The ring 8 is provided at its inner side with a series of gear teeth 9. A gear segment 10 is mounted upon a shaft 11 and its teeth mesh with the teeth 9. Cam disks 12 have their opposite edge portions received in the grooves 7 of the lugs 2 and each disk is provided with an arm 13. The inner ends of the arms 13 are pivotally connected with the ring 8.

Arcuate brake shoes 14 are provided at their inner sides and at points midway between their ends with blocks 15 which are slidably received between the lugs 3. Springs 16 are disposed transversely across the lugs 3 and are connected at their ends to the brake shoes 14 at the opposite sides of the blocks 3. The ends of the shoes 14 are provided with grooves 17 which receive the outer portions of the peripheries of the cam disks 12. The springs 16 are under tension and have a tendency to normally return the shoes 14 at retracted or withdrawn positions with relation to the frame 1.

When it is desired to apply the brake, the shaft 11 is turned whereby the gear segment 10 is partially rotated and inasmuch as the teeth of the said segment mesh with the teeth 9 of the ring 8, the said ring is turned about the spider 4. As the ring 8 turns the arms 13 are swung from tangential positions with relation to the frame to radial positions and consequently the cam disks are moved radially along the grooves 7 and turn slightly in the grooves 17. This movement upon the part of the cam disks moves the brake shoes 14 outwardly against the tension of the springs 16 and thus the brake shoes are applied. When the shaft 11 is turned in a reverse direction the cam disks 12 are moved inwardly along the lugs 3 and the springs 16 return the brake shoes to their normal positions.

Having described the invention, what is claimed is:—

A friction brake comprising a frame, a ring mounted for turning movement thereon, shoes mounted for movement radially of the frame, guides for directing the movement of the shoes, springs disposed transversely of said guides and connected with the shoes, said shoes being provided at their ends with grooves, grooved lugs mounted upon the frame, disks mounted for sliding and turning movement in the grooves of the lugs and having portions entering the grooves of the shoes and arms carried by the disks and pivotally connected with the ring.

In testimony whereof I hereunto affix my signature.

JESSE HOPKINS